United States Patent

[11] 3,574,443

| [72] | Inventor | Yasuhiro Nanba<br>Toyokawa-shi, Japan |
|---|---|---|
| [21] | Appl. No. | 797,433 |
| [22] | Filed | Feb. 7, 1969 |
| [45] | Patented | Apr. 13, 1971 |
| [73] | Assignee | Minolta Camera Kabushiki Kaisha<br>Minami-ku, Osaka, Japan |
| [32] | Priority | Feb. 14, 1968, Mar. 18, 1968, June 19, 1968 |
| [33] | | Japan |
| [31] | | 43/9505, 43/21248 and 43/42452 |

[54] APPARATUS FOR DETERMINING THE QUANTITY OF TIME-INTEGRATED LIGHT
6 Claims, 11 Drawing Figs.

[52] U.S. Cl............................................................ 356/215,
250/214, 350/151, 356/223, 356/226, 356/228
[51] Int. Cl.............................................................. G01j 1/46
[50] Field of Search............................................ 356/215,
223, 226; 315/228, 151; 250/214 (Photo)

[56] References Cited
UNITED STATES PATENTS

| 2,897,720 | 8/1959 | Offner............................ | 356/226X |
| 3,049,050 | 8/1962 | Thomas.......................... | 250/214P |
| 3,458,770 | 7/1969 | Denger........................... | 250/214P |
| 3,464,773 | 9/1969 | Waz................................ | 356/215 |

*Primary Examiner*—Archie R. Borchelt
*Assistant Examiner*—C. M. Leedom
*Attorney*—Watson, Cole, Grindle and Watson ABSTRACT: The present invention concerns an apparatus using a transistor circuit including a photocell for determining the quantity of time-integrated light and it specifically concerns a flash exposure meter which determines the time-integrated value of the light reflected from the object illuminated by the flash light or the incident light on the object.

INVENTOR,
YASUHIRO NANBA
BY Watson, Cole, Grindle & Watson

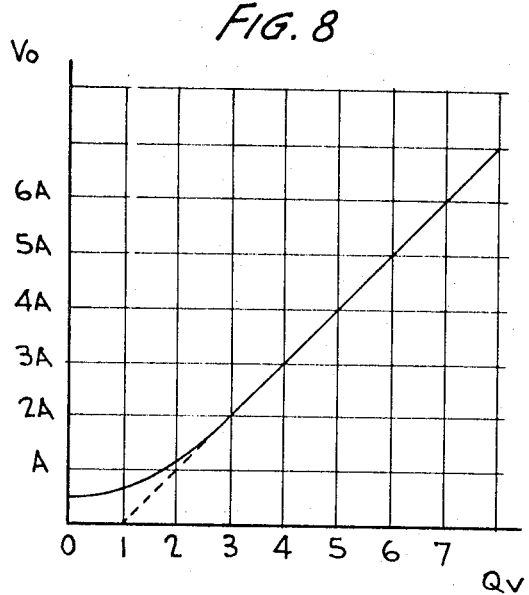
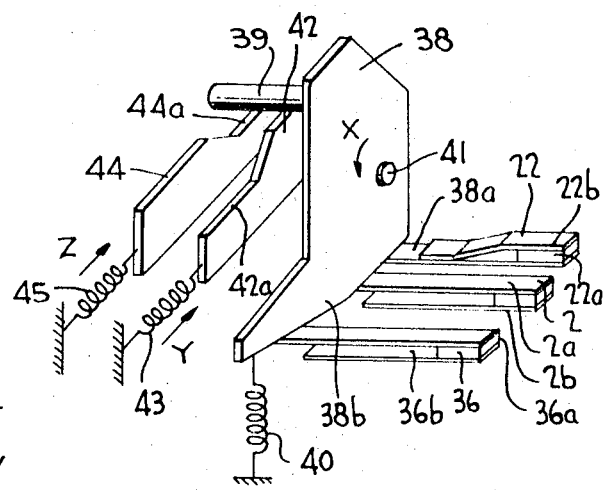
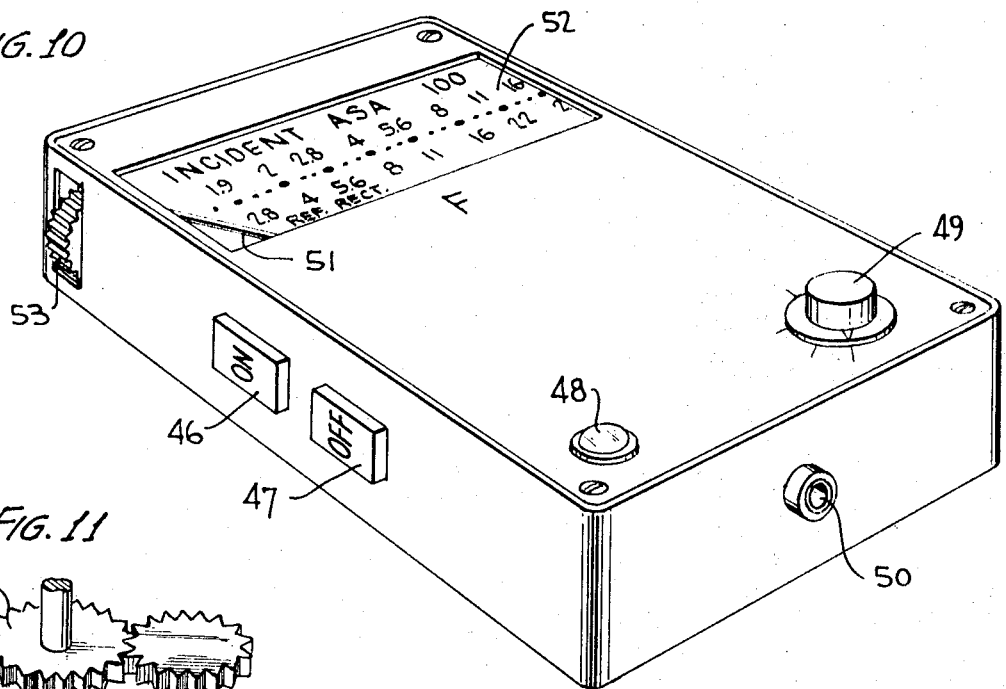
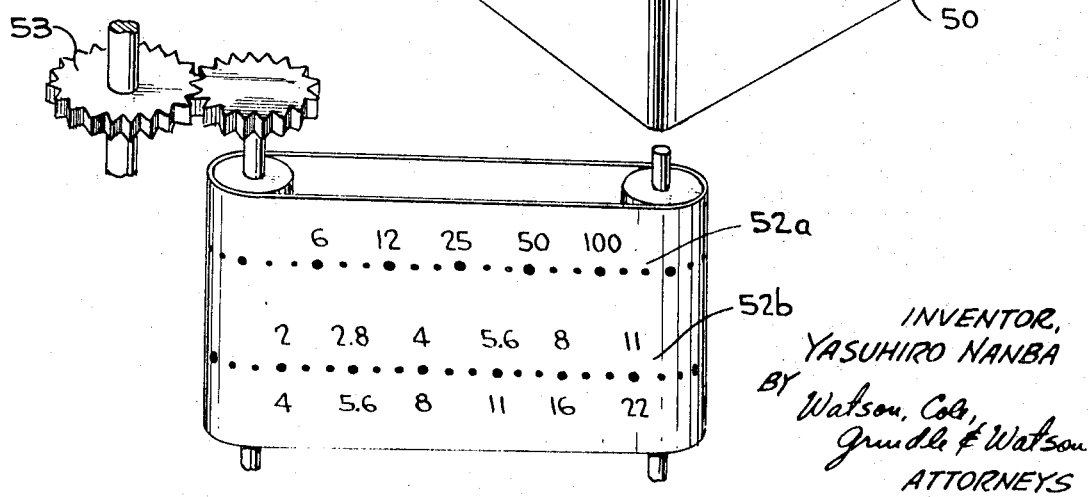

APPARATUS FOR DETERMINING THE QUANTITY OF TIME-INTEGRATED LIGHT

BACKGROUND OF THE INVENTION

There have been known various exposure meters for determining the suitable exposure condition for various photographic objects, but most of them measure by a galvanometer, the photoelectric current that arises in proportion to the light intensity incident on the photocell.

These exposure meters, however, cannot respond to such light as flash light which changes a great deal during a short period of time, and even if they do, it is extremely difficult to read accurately the indicated value of the meters which also changes quickly.

With flash light photography, therefore, the exposure conditions have been set, without considering the brightness or intensity of illumination of the object illuminated by the flash light, by obtaining the aperture from the guide number shown on each flash bulb and the camera distance. However, this method has the serious disadvantage that the suitable exposure condition can be obtained only when the object is illuminated by the flash light alone. The suitable exposure condition cannot be obtained when there are many things, or nothing around the object (either in the foreground or background), that reflects light and when the object is illuminated by light other than that from the flash light, as when photographing against the light.

SUMMARY OF THE INVENTION

With flash light photography, therefore, it is practical to determine the so-called quantity of time-integrated light, i.e. the value obtained by integrating for a given period of time the intensity of the light illuminating the object or reflected therefrom as the same flash bulb is flashed in advance of the actual photography to determine the suitable exposure. And the detector, such as the photocell, which is used for determining such quantity needs to be highly sensitive to respond quickly to the change in the intensity of light and also the photoelectric current that is generated by the detector must be in proportion for a wide range to the intensity of the light incident on the detector. Also it is desirable that the charged voltage of the integrating condenser, which corresponds to the said time-integrated light quantity, should be in proportion to the logarithm of the time-integrated photoelectric current because the time-integrated photoelectric current changes in an exponential order, the integrating condenser is charged to a very high voltage if the charged voltage is not in proportion to the time-integrated photoelectric current. Consequently a high-voltage power source and parts which can withstand high voltage are required which necessitates large and complex elements and circuitry, thereby making the apparatus unsuitable for a portable exposure meter. If the high-voltage charge is avoided to eliminate the above difficulties, then the measuring range becomes so small that the apparatus is not useful.

On the other hand, because the exposure condition of cameras in general, i.e. the combination of the shutter speed and the aperture sometimes with the film speed, can be expressed by the exponent of 2 which is known as light value or exposure value, it is desirable that the time-integrated light quantity too should be shown by the exponent 2 and also at the regular intervals, and this can be realized by making the charged voltage of the integrating condenser proportional to the logarithm whose base is 2 of the photoelectric current.

The primary object of the present invention is to provide a portable time-integrated light quantity determining apparatus for the integral value during a given period of time of the brightness or illumination intensity of the photographic object which is illuminated by light rays, including such illuminating light as flash light that changes a great deal during a short period of time.

A second is to obtain a wide light measuring range as against the limited charged voltage range of the integrating condenser by making the charged voltage of the integrating condenser proportional to the logarithmic value of the time-integrated photoelectric current and further to obtain an indication at regular intervals of the logarithm value.

A third object is to provide in such apparatus photoelectric current which is, for a wide range, proportional to the intensity of the light incident on the photovoltaic cell by maintaining constant the terminal voltage of the photovoltaic cell or photoconductive cell with the combination of a transistor circuit and the photovoltaic cell, which circuit has a quick response characteristic and generates a photoelectric current proportional to the incident light intensity when there is no load on the photoconductive cell whose conductive rate changes in proportion to the incident light intensity. It is a further object to obtain in such apparatus a photoelectro converting circuit with high sensitivity by amplifying the photoelectric current.

Another object of the present invention is to obtain in such apparatus a switching mechanism for discharging the integrating condenser at the same time as the power source switch is set "on" and the trigger switch for flash is set "on" after a small time lag, and by another switch operation to reset the power source switch, the switch for discharge and the trigger switch.

Further, another object is to provide an apparatus for determining the time-integrated light quantity having a scale system which can be made merely by biasing the scale to correspond to every film speed by making the charged voltage of the integrating condenser proportional to the logarithm whose base is 2 of the time-integrated photoelectric current and by scaling the indication system scale at regular intervals against the exposure value.

BRIEF DESCRIPTION OF THE DRAWINGS

FIG. 8 is a graph showing the relationship between the logarithm whose base is 2 of the quantity charged in the integrating condenser and the charged voltage of the condenser in FIG. 7;

FIG. 9 is a perspective view of a preferred embodiment of the switching mechanism;

FIG. 10 is an exterior perspective view of an example of a flash exposure meter using the apparatus of the present invention for determining the time-integrated light quantity; and FIG. 11 is a perspective view showing an example of the scale mechanism of the present invention.

DESCRIPTION OF THE PREFERRED EMBODIMENT

Figure 1:
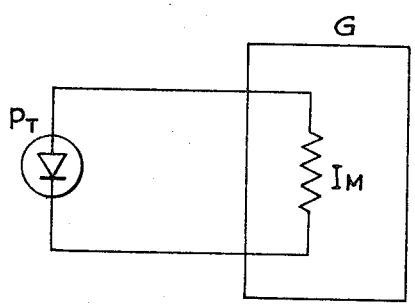
FIG. 1 is a block diagram of the circuit of a conventional exposure meter for detecting the photoelectric current of the photoconductive element.

The known conventional exposure meter circuit as shown in FIG. 1 comprises photoconductive element $P_T$ and the photoelectric current detecting circuit G and $I_M$ represents the internal impedance within the detecting circuit G.

Figure 2:
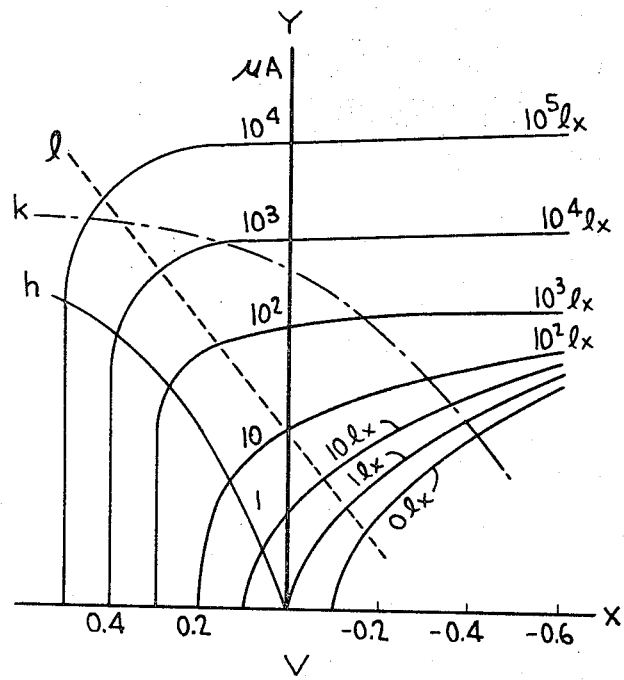
FIG. 2 is a graph showing the relationship between the output voltage of the photoconductive element and the photoelectric current with the illumination intensity as the parameter wherein the abscissa shows the output voltage and the back bias impressed voltage and the ordinate shows the photoelectric current which is generated by the photoconductive element cell.
Figure 3:
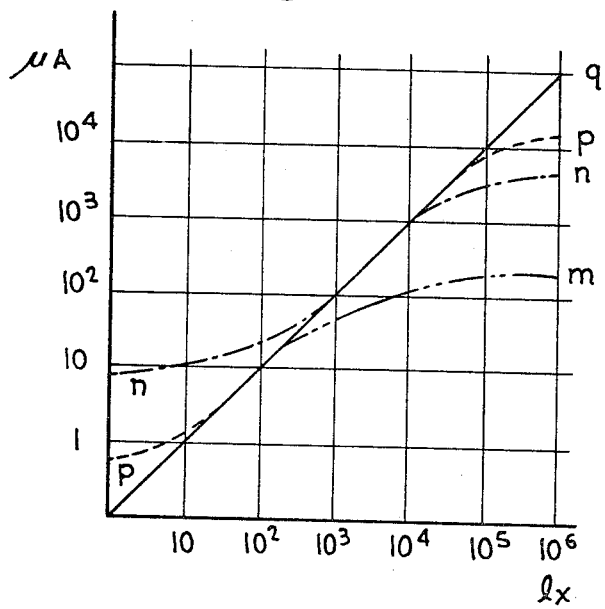
FIG. 3 is a graph illustrating the illuminance-photocurrent characteristic which appears when various loads are imposed on the photoconductive element cell having characteristics as shown in FIG. 2, wherein the abscissa shows the illumination intensity and the ordinate shows the photoelectric current intensity.

Generally, because the output voltage of the photoconductive element $P_T$ used in the circuit is low, the lead characteristic presented by impedance $I_M$ is represented by the curve $h$ of FIG. 2 and the illuminance-photocurrent characteristic by the curve $m$ of FIG. 3. The linearity between the illuminance and the photoelectric current is greatly lost in the high illuminance area. When some direct current power source battery is connected in series with the photovoltaic cell in order to efface the inside impedance of the detecting circuit G, the load characteristic is represented by curve $k$ of FIG. 2 and the illuminance-photocurrent characteristic is represented by curve $n$ of FIG. 3 and the linearity between the illuminance. The photoelectric current in the high illuminance area is restored, but in the low illuminance area the leakage current increases and the linearity is lost.

Figure 4:
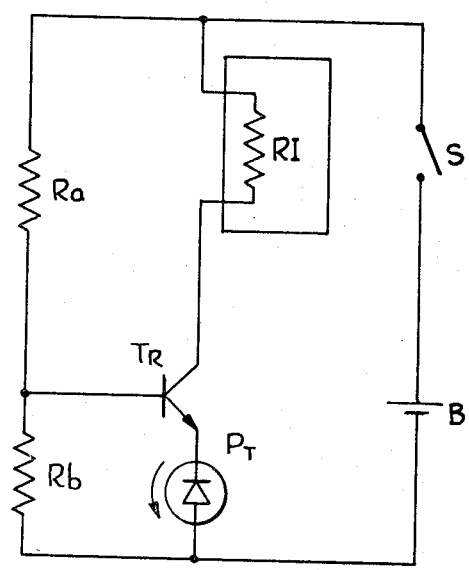
FIG. 4 illustrates a known photoelectric switching circuit with a transistor.

To eliminate these defects such a circuit as is shown in FIG. 4 has been used. In FIG. 4, B represents the power source battery, S the power source switch, G the photoelectric current detecting circuit, $R_I$ the internal circuit impedance, $P_T$ the photoconductive element, $T_R$ the amplifying transistor and $Ra$, $Rb$ represent the voltage dividing resistances or bias resistances which supply a given voltage to the base of the transistor $T_R$.

The load characteristic of the photoconductive element of such a circuit is illustrated as curve $l$ of FIG. 2 and the illuminance-photocurrent characteristic as curve $P$ of FIG. 3. The linearity between the illuminance and the photoelectric current is greatly restored both in the high and low illuminance areas and, because the photoelectric current flows into the collector through the emitter of the transistor $T_R$, a large output voltage can be obtained.

As is evident from FIG. 3, however, the linearity is not obtained in the highest and lowest illuminance areas, and a linearity extending to a still larger range is required for the measurement of a flash light whose intensity changes cover such a very large range.

Figure 5:
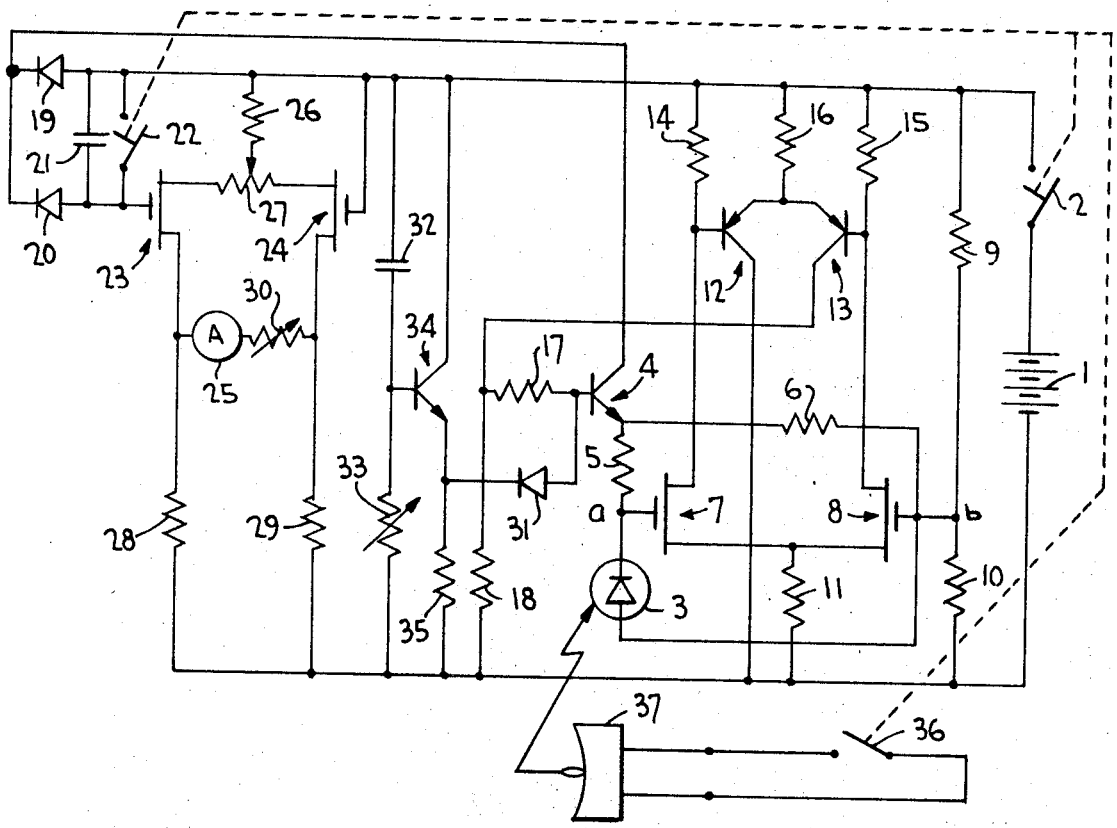
FIG. 5 is a preferred circuit embodiment of the present invention.

FIG. 5 shows the circuit of one preferred embodiment of the present invention. The power source switch 2 is connected in series with the power source batter 1, and in the photoelectro converting circuit, the photoconductive element 3, having a quick response characteristic, is used as a detector which receives the reflected light from the object or the illuminated light therefrom, and is connected in series with one of the two resistances 5, 6 which are connected with the emitter of the transistor amplifier 4 having a large amplification factor through which flows, through the collector, most of the photoelectric current from the said photoconductive element 3. This same cell 3 is also connected with each gate of the field effect transistor 7, 8 which form part of a differential amplifier circuit. The resistance values $R_5$, $R_6$ of the two resistances 5, 6 satisfy the relationship: $R_5/R_6=\alpha$, $\alpha \gg 1$. Resistances 9, 10 are the dividing resistances which supply voltage to the gate of the field effect transistor 8, and the resistance 11 is the source resistance for the field effect transistors 7, 8. With each base of the transistors 12, 13, which complete the differential amplifier circuit, are connected the resistances 14, 15 which supply voltage to the bases thereof and are also connected with the drain of the field effect transistors 7, 8. The resistance 16 is the emitter resistance for the transistors 12, 13. The resistance 17 is the excess current prevention resistance of the transistor amplifier 4, and the resistance 18 supplies a negative feedback voltage to the base of the transistor amplifier 4.

In parallel with the collector of the transistor amplifier 4 are connected two diodes 19, 20, and the diode 19 is connected in series with the photoelectric current integrating condenser 21 in parallel with which is connected the condenser discharge switch 22, constituting the light integrating circuit. The field effect transistors 23, 24 which constitute another differential amplifier circuit detect the charged voltage of the photoelectric current integrating condenser 21, and drive the galvanometer which indicates the measured integrated light quantity value. The resistance 26 is the source resistance of the field effect transistors 23, 24, and 27 is the resistance which adjusts the characteristic of transistors 23, 24. The resistance 28, 29 are connected with the drain of the same transistors 23, 24 and supply voltage on both sides of the galvanometer 25; i.e. the difference in voltage which arises from the drain current of the transistor 23 and resistance 28, and the drain current of the transistor 24 and resistance 29, causes a potential difference between the two terminals of the galvanometer 25. The resistance 30 adjusts the sensitivity of the galvanometer 25.

The condenser 32 and the variable resistor 33 constitute a CR delay circuit, and when power source switch 2 is set "on" the condenser 32 begins to be charged, and, after a period of time which is determined by a given resistance value of the variable resistor 33 and the capacity of the condenser 32, the base voltage of the transistor 34 is lowered, and the diode 31 is connected with the emitter of the transistor 34 is forward biased. The base voltage of the transistor 4 is reduced to zero and the photoelectric current that flows through the emitter of the transistor 4 is cut off, and thus controlling the integrating time of the circuit. 35 is the emitter resistance of the transistor 34, and 36 is the trigger switch of the flash 37 and is, as will be described below, so constructed as to cooperate with the power source switch 2 and the condenser discharge switch 32.

With the circuit described above, the resistances 9, 10 are set in advance so as to let the points $a$ and $b$ of FIG. 5 be of substantially equal potential when a certain current flows in the photoconductive element 3, and when the photoelectric current of the same cell 3 rises the potential of the point $a$ goes down and so does the gate potential of the field effect transistor 7. Consequently the voltage across resistance 14 is lowered while the voltage across 15 is increased, so that the collector current of the transistor 13 increases and voltage across resistance 18 increases, so that the potential of the point $a$ is restored to its original state.

When, conversely, the photoelectric current of the photoconductive element 3 is less than the originally set current and the potential of the point $a$ goes up, the operation described above is reversed, thereby restoring the equilibrium, so that whether the photoelectric current is large or small, the points $a$ and $b$ are maintained at equal potential by this circuit.

For example, when the feedback ratio at the point $a$ of this circuit is $\beta$, the voltage change at the point $a$ caused by the change in the photoelectric current when there is no feedback is $\Delta x$, and the voltage change at the point $a$ when there is negative feedback is $\Delta y$, then, $$\Delta y = \Delta x - \beta \Delta y$$

$$\Delta y = \frac{\Delta x}{1+\beta}$$

When the value of $\beta$ is made suitably large $\Delta y$ approaches zero regardless of $\Delta x$, i.e. the terminal voltage of the photoconductive element 3 can be made to approach zero regardless of the current change therein.

Therefore, by using such a feedback circuit as described above, the linearity of the illuminance-photocurrent characteristic may be achieved for the large range shown by the straight line $q$ of FIG. 3.

As has been described above, there is the following relationship between the resistance values of the resistances 5 and 6:

$$\frac{R_5}{R_6}=\alpha, \qquad \alpha \gg 1$$

and when the currents that flow through the resistances 5, 6 are respectively $I_5$, $I_6$, and the terminal voltages $V_5$, $V_6$:

$$R_5 \cdot I_5 = V_5$$
$$R_6 \cdot I_6 = V_6$$

and because the voltages at the points a and b are substantially always equal:
$V_5 = V_6$
therefore
$R_5 \cdot I_5 = R_6 \cdot I_6$ $$\frac{I_6}{I_5} = \frac{R_5}{R_6} = \alpha$$

$I_6 = \alpha I_5$ and because the emitter current of the transistor 4 is:
$I_5 + I_6 = (\alpha + 1) \cdot I_5$ So that, if the base current is to be disregarded, the photoelectric current $I_5$ flows into the collector being amplified by $(\alpha+1)$ times.

Figure 6:
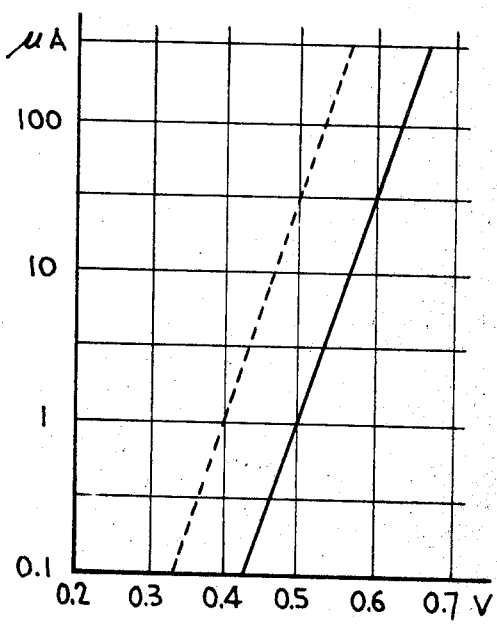
FIG. 6 is a graph showing the current-voltage characteristic of a diode.

It is also possible to use two diodes instead of the resistances 5 and 6. As is shown by the solid line of FIG. 6, the current $I$ that runs through the diodes increases exponentially as the impressed voltage $V$ increases, and, when the circuit constant is so set as to make the points a and b be of equal potential with a certain photoelectric current, and if the diode characteristic does not change, the currents that run through the diodes are the ratio 1 to 1 whereby the emitter current of the transistor 4 becomes 2 times as much as the photoelectric current. When the point b—side voltage of the diode used for the resistance 6 is lowered in advance below the voltage at the point b, the characteristic of the current that runs through the diode used for the resistance 6 is shown by the dotted line of FIG. 6, and the ratio of the currents that run through the diodes used for the resistances 5 and 6 becomes always constant against the current change of the diode used for the resistance 5, i.e. the emitter voltage change of the transistor 4. Therefore, with two diodes instead of the resistances 5 and 6, the photoelectric current can also be amplified and the current change range can be enlarged.

Figure 7:
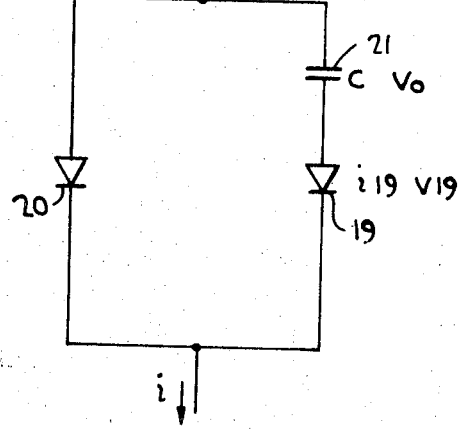
FIG. 7 is a partially enlarged circuit of the circuit for making the charged voltage of the integrating condenser of the preferred embodiment shown in FIG. 5 proportional to the logarithm whose base is 2 of the time-integrated photoelectric current.

FIG. 7 shows the light quantity integrating circuit of the diodes 19, 20 and the photoelectric current integrating condenser 21. Generally, the relationship between the current and voltage of the diode is:

$$I = A_1 e^{-qV_g/kT}(e^{V_c/kT} - 1) \quad (1)$$

$A_1$: constant
$q$: charge of an electron
$k$: Boltzman's constant
$T$: absolute temperature
$Vg$: band voltage
$Vc$: voltage on the diode Because $A_1, q, k, T, Vg, Vc$ are all constants here, when $$A_0 = A_1 e^{-qV_g/kT} \qquad B_0 = \frac{q}{kT}$$

the equation (1) becomes:
$$I = A_0(e^{B_0 V_c} - 1) \quad (2)$$

and because the value of $e^{B_0 V_c}$ is very large compared with 1, the equation (2) becomes:
$$I = A_0 e^{B_0 V_c} \quad (3)$$

To change this into the logarithmic equation whose base is 2:
$\log_2 I = \log_2 A_0 + B_0 V_c \log_2 e$
therefore:
$$V_c = \frac{1}{B_0 \log_2 e} \cdot \log_2 I - \frac{\log_2 A_0}{B_0 \log_2 e} \quad (4)$$

Further, when
$$A = \frac{1}{B_0 \log_2 e} = \frac{kT}{q \log_2 e}$$

$$K = \frac{1}{B_0} \log_e A_0 = \frac{kT}{q} \log_e A_1 - Vg$$

then
$$V_c = A \log_2 I + k \quad (5)$$

When the capacity of the condenser 21 is $c_{21}$, the charged voltage is $V_{21}$, the current that flows through the diode 19, is $i_{19}$, the terminal voltage of the diode 19 is $V_{19}$, the amplified photoelectric current that runs through the collector of the transistor 4 is $i$, because with the diodes in general the constant $A$ is almost the same with each diode and the constant $K$ is slightly different with each diode,
$V_{19} = A \log_2 i_{19} - K$
$V_{21} = \{A \log_2(i - i_{19}) - k'\} a - 1\{A \log_2 i_{19} - K\}$ $$V_{21} = A \log_2 \frac{i - i_{19}}{i_{19}} + k - k' \quad (6)$$

And to express the charge $Q$, which is proportional to the light quantity, by the light quantity exponent $Q_v$, $Q = \int i \, dt = B \cdot 2^{Q_v}$ ($B$ is the proportional constant) and therefore:

$$i = \frac{d}{dt}(B \cdot 2^{Q_v}) \quad (7)$$

and because the charged voltage of the condenser 21 is $v_{21}$ and the capacity is $C_{21}$,
$C_{21} V_{21} = \int i_{19} dt$
and therefore $$i_{19} = C_{21} \frac{dV_{21}}{dt} \quad (8)$$

To substitute the equations (7)(8) into the equation (6)

$$V_{21} = A \log_2 \frac{\frac{d}{dt}(B \cdot 2^{Q_v}) - \frac{d}{dt}(C_{21}V_{21})}{\frac{d}{dt}(C_{21}V_{21})} + K - K'$$

$$= A \log_2 \frac{d(B \cdot 2^{Q_v} - C_{21}V_{21})}{d(C_{21}V_{21})} + k - K'$$

therefore
$$2^{\frac{V_{21} - K + K'}{A}} d(C_{21}V_{21}) = d(B \cdot 2^{Q_v} - C_{21}V_{21})$$

and to integrate and put in order the both members of the equation:

$$2^{\frac{K' - K}{A}} \int 2^{\frac{C_{21}V_{21}}{C_{21}A}} d(C_{21}V_{21}) = \int d(B \cdot 2^{Q_v} - C_{21}V_{21}) + D$$

(D is the integral constant)

$$2^{\frac{K' - K}{A}} \cdot \frac{1}{\log_e 2} C_{21} A \cdot 2^{\frac{V_{21}}{A}} = B \cdot 2^{Q_v} - C_{21}V_{21} + D$$

$$2^{\frac{K' - K}{A}} \cdot \frac{1}{\log_e 2} C_{21} A \cdot 2^{\frac{V_{21}}{A}} + C_{21}V_{21} - D = B \cdot 2^{Q_v} \quad (9)$$

and when the capacity $C_{21}$ of the condenser 21 is so set as to make the value of $(C_{21}V_{21} - D)$ small enough, $$2^{\frac{K' - K}{2}} \cdot \frac{1}{\log_e 2} \cdot C_{21} A \cdot 2^{\frac{V_{21}}{A}} = B \cdot 2^{Q_v}$$

$$V_{21} = A \cdot Q_v + A \log_2 \left(\frac{B}{C_{21}A} \log_e 2\right) + K - K' \quad (10)$$

and it is possible to make the voltage $V_{21}$ of the condenser 21 proportional to the exponent of light quantity $Q_r$.

FIG. 8 is the graph of equation (9 galvanometer and it is evident that the voltage $V_{21}$ of the condenser 21 is proportional to $Q_V$ if the time-integrated photoelectric current, i.e. $Q_V$ is large enough as against the condenser capacity $C_{21}$. The voltage $V_{21}$ of the condenser 21 is also the gate voltage of the field effect transistor 23 and the current in response to the voltage $V_{21}$ flows through the galvanometer 25 which shows a current-deflection characteristic at regular intervals in accordance with $Q_V$. Therefore the scale of galvanometer 25 can be made to be a regular-interval scale of the so-called exposure value or aperture value, and this scale can be made to correspond with the intervals in the progression of the film speed, so that a scale in accordance with each film speed may be obtained.

The power source switch 2, condenser discharge switch 22 and flash trigger switch 36 of the circuit of FIG. 5 form a cooperative switches mechanism so that after the condenser discharge switch 22 is set "off" and then the main power switch 2 is set "on," the flash trigger switch 36 is set "on" after a small time lag. FIG. 9 shows the construction of the switching mechanism.

As is shown in FIG. 9, the switches 2, 22 and 36 have flexible contacts 2a, 22a and 36a and the fixed contacts 2b, 22b and 36b which face each other with the insulating material in between, and they correspond to the switches of the circuit of FIG. 5 which have the same numbers. As is evident from FIG. 9, when the flexible contacts 2a, 22a and 36a are not pressed down by the edge 38a of the lever 38 or by the edge 38b which extends from the edge 38a, the switches 2 and 36 are "off" as their two contacts are not engaged and the switch 22 is "on" for its two contacts are engaged.

The lever 38 is mounted by pin 39 and spring 40 provides rotative force around the shaft 41 in the direction of the arrow X. The plate 42 has a cut 42a and is pulled by the spring 43 and is connected with an exterior operating part which is not shown in the FIG., so as to be moved in the direction of the arrow Y against the spring 43. The plate 44 has a cut 44a and is pulled by the spring 45 and is connected with another operating part to move in the direction of the arrow against the spring 45.

When the plate 42 is moved in the direction of the arrow Y by an exterior operation and the cut 42a engages pin 39, the lever 38 is rotated by the spring 40 around the shaft 41 in an anticlockwise direction and the edges 38a and 38b press down successively the flexible contacts 22a, 2a and 36a. The two contacts 22a and 22b of the switch 22 come apart and then the two contacts 2a and 2b of the switch 2 engage, and then, after a small time lag, the two contacts 36a and 36b of the switch 36 engage. The amount of the time lag is decided by the angle $\theta$ at which the edges 38a and 38b contact their respective counterpart members.

When the plate 44 is moved against the spring 45 in the direction of the arrow Z by an external member (not shown) after the measurement is achieved, the pin 39 is pushed up by the cut 44a and the cut 42a of the plate 42 releases from pin 39 and is restored by the spring 43 to its original state and so the contacts of the three switches are restored to their original positions.

In accordance with the operation described above, first the condenser discharge switch 22 is set to "off," then the power source switch 2 is set to "on" starting the charging of condenser 32 which constitutes the CR delay circuit. The photoelectric integrating condenser 21 is conditioned to store the photoelectric current, and after a small time lag the flash trigger switch 36 is set to "on," and the flash 37 is fired. Part of the flash light or the light reflected from the object illuminated by the flash light and the light which is not the flash light but which affects the exposure condition of the object are received by the photoconductive element 3 which is placed in the detector not shown in the FIGS. The photoconductive element, whose terminal voltage is always kept at zero by the said feedback circuit, response quickly to the incident light and generates photoelectric current in proportion to the incident light. The generated photoelectric current is amplified $\alpha+1$ ($\doteq R_5/R$) times as much by the differential amplifier circuit, flows through the diodes 19, 20, through the collector of the transistor 4 and charges the photoelectric current integrating condenser 21. The charged voltage $V_{21}$ of this condenser is proportional to the logarithmic value whose base is 2 of the time-integrated photoelectric current and therefore to the value of $Q_1$. The charged voltage $V_{21}$ is the gate voltage of the field effect transistor 23 and the current in proportion to the charged voltage $V_{21}$ flows through the galvanometer 25, which shows the current-deflection characteristic at regular intervals as the logarithm of the light value, i.e. the exponent value $Q_1$.

On the other hand, by the given voltage charge of the condenser 32, after fixed delay which is determined by the preset value of the variable resistor 33, and the electric capacity of the condenser 32, the base voltage of the transistor 34 is lowered, the diode 31 is forward biased and the photoelectric current flowing through the collector of the transistor 18 is cut off, so that the integrating condenser 21 is no longer charged. The diode 20 becomes back-biased by the voltage of the condenser 21, which is kept at a constant voltage until the discharge switch 22 is set "on" and the galvanometer 25 maintains a fixed indication in the meantime.

Figure 10 shows an exterior view of the flash meter of the present invention inside of which is the circuit of FIG. 5. It is so constructed that when the operation button 46 is pressed the plate 42 of FIG. 9 moves in the direction of the arrow Y and when the stop button 47 is pressed the plate 44 moves in the direction of the arrow Z. The voltage checker circuit is thereby set "on" and the checker lamp 48 shows whether or not there is power source voltage. 49 is the measuring time setting dial and it operates variable resistor 33 of the circuit of FIG. 5 to select an optional measuring time that corresponds to the shutter speed. 50 is the synchro-terminal which is connected with the flash trigger switch 36 inside the apparatus and also can be connected with the terminal of the flash gun. 51 is the needle of the galvanometer and it indicates, together with the scale plate 52, the exposure value or light value.

Thus the optional measuring time is set in advance by the measuring time setting dial 49 and the operation button is pressed with the detecting part (not shown in the FIG.) facing the direction from which the light to be measured comes. The operation of the switching mechanism causes the photoelectric current to be integrated by the photoelectric current integrating condenser and the condenser 31 of the integrating time control circuit is charged. Then the flash trigger switch 36 is set "on" and the flash 37, which is connected with the synchro-terminal 50, flashes and the light flash is measured. After the period of time set by the measuring time setting dial 49, the supply of the photoelectric current to the integrating condenser 21 through the diodes 19, 20 is cut off, and the needle 51 of the galvanometer 25 shows the deflection whose angle is proportional to the charged voltage of the integrating condenser 21 that has been charged by the photoelectric current until it is cut off. The voltage $V_{21}$ is proportional to the logarithm whose base is 2 of the time-integrated photoelectric current during the period of time that is set as described above. Therefore the galvanometer 25 shows an indication which is linear with respect to the value of the logarithm whose base is 2 of the light which has been received during the period of time set in advance, i.e. as against the so-called exposure value or light value, and it is possible to adopt a scale which is at regular intervals as against these values. And as is well-known, the progression of the aperture and the progression of the film speed are the progression of the exponent whose base is 2 and it is possible to use the aperture scale at regular intervals as the scale of the galvanometer 25 instead of the exposure value or light value. And when the film speed scale is recorded on the same scale band and at the same intervals as the aperture scale, then it becomes possible to read the proper aperture value for an optional film speed. FIG. 11 shows a preferred embodiment of this concept. The film speed scale 52a and the aperture scale 52b are recorded at the same scale intervals on one scale band and the scales 52a and 52b on the scale band are moved right and left by the film speed changing dial 53. The needle 51 indicates the aperture value that corresponds to the optional film speed value that is shown in the film speed window 54 of FIG. 10.

I claim:
1. Light integrating switching apparatus, comprising:
 a constant DC power source,
 photoconductive means for producing photoelectric current in response to light incident thereon,
 means for amplifying said electric current to produce a linear current output,
 means for integrating said linear current output, said means including an integrating condenser serially connected to a first diode and a second diode parallelly connected with said condenser and said first diode, said first and second diodes each having a terminal voltage proportional to the logarithm of current through the diode so that said condenser integrates said linear current output to provide a voltage proportional to the logarithm of said photoelectric current, timing control means including an RC delay circuit for controlling the charging time of said means for integrating, means for detecting said integrated voltage, and means for indicating said detected voltage.

2. Light integrating apparatus as in claim 1 further comprising a power source switch connected in series with said DC power source:

a discharge switch for discharging said condenser, means for providing a flash light output, said means including a flash trigger switch serially connected therewith, and said switches are constructed so that when said discharge switch is "off" said power source switch is "on" and said flash trigger switch is "on" after a predetermined time delay.

3. Light integrating apparatus as in claim 1 wherein the resistance in said timing control means is variable for varying the delay time.

4. Light integrating apparatus as in claim 1 wherein said means for amplifying includes feedback means for maintaining the terminal voltage of said photoconductive means constant and means for establishing the operating point of said photoconductive means to provide a photoelectric current output therefrom proportional to the intensity of light incident thereon, said means for amplifying further includes a differential amplifier composed of field effect transistors and said photoconductive means is connected between the gates of said field effect transistors.

5. Light integrating apparatus as in claim 4 wherein said means for indicating includes a scale band movable in accordance with the sensitivity of a film and having scale spacings in accordance with exposure values of said film whereby a required exposure is automatically obtained corresponding to a given film sensitivity.

6. Light integrating apparatus as in claim 5 wherein said means for detecting includes another differential amplifier including additional field effect transistors, said integrating condenser is connected between the gates of said additional field effect transistors.

UNITED STATES PATENT OFFICE
CERTIFICATE OF CORRECTION

Patent No. 3,574,443                    Dated  April 13, 1971

Inventor(s)  Yasuhiro Nanba

It is certified that error appears in the above-identified patent and that said Letters Patent are hereby corrected as shown below:

Claim 1:  Column 8, line 67, cancel "photoconductive".

Claim 4:  Column 10, line 1, after "wherein" insert --said means for producing photoelectric current is a photovoltaic cell and--.

Lines 3 and 4, cancel "photoconductive means" and insert --photovoltaic cell--.

Line 5, cancel "photoconductive means" and insert --photovoltaic cell--.

Line 9, cancel "photoconductive means" and insert --photovoltaic cell--.

Signed and sealed this 14th day of December 1971.

(SEAL)
Attest:

EDWARD M. FLETCHER, JR.          ROBERT GOTTSCHALK
Attesting Officer                Acting Commissioner of Patents